(12) United States Patent
Lee et al.

(10) Patent No.: US 10,156,757 B2
(45) Date of Patent: Dec. 18, 2018

(54) LIQUID CRYSTAL DISPLAY DEVICE

(71) Applicant: Samsung Display Co. Ltd., Yongin-si (KR)

(72) Inventors: Hyun Sup Lee, Hwaseong-si (KR); Jung Hun Noh, Yongin-si (KR); Keun Kyu Song, Seongnam-si (KR); Sang Hee Jang, Bucheon-si (KR); Byung Seok Choi, Seoul (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 136 days.

(21) Appl. No.: 15/271,448

(22) Filed: Sep. 21, 2016

(65) Prior Publication Data
US 2017/0261821 A1    Sep. 14, 2017

(30) Foreign Application Priority Data
Mar. 14, 2016   (KR) .......................... 10-2016-0030225

(51) Int. Cl.
    *G02F 1/1343*     (2006.01)
    *G02F 1/1335*     (2006.01)
    *G02F 1/1362*     (2006.01)

(52) U.S. Cl.
    CPC .. *G02F 1/134336* (2013.01); *G02F 1/136286* (2013.01); *G02F 1/133514* (2013.01); *G02F 1/134363* (2013.01); *G02F 2001/134372* (2013.01); *G02F 2201/121* (2013.01); *G02F 2201/123* (2013.01)

(58) Field of Classification Search
    CPC combination set(s) only.
    See application file for complete search history.

(56) References Cited

U.S. PATENT DOCUMENTS

| | | | |
|---|---|---|---|
| 7,583,279 B2 | 9/2009 | Brown Elliott et al. | |
| 2015/0234243 A1* | 8/2015 | Oono | G02F 1/133514 349/106 |

* cited by examiner

*Primary Examiner* — Wen-Ying P Chen
(74) *Attorney, Agent, or Firm* — Cantor Colburn LLP

(57) ABSTRACT

A liquid crystal display includes first and second substrates facing each other and including pixels in a first direction and in a second direction that crosses the first direction, and pixel electrodes disposed in the pixels, respectively, over a common electrode, each of the pixel electrodes including branch electrodes, which extend in the second direction, where the pixels include first pixels, which display a white color, and second pixels, which display one of a red color, a green color, and a blue color, the pixel electrodes include first pixel electrodes, which are disposed in the first pixels, respectively, and second pixel electrodes, which are disposed in the second pixels, respectively, and a first average distance between every two adjacent first and second pixel electrodes in the first direction is smaller than a second average distance between every two adjacent second pixel electrodes in the first direction.

17 Claims, 10 Drawing Sheets

LIQUID CRYSTAL DISPLAY DEVICE

This application claims priority to Korean Patent Application No. 10-2016-0030225 filed on Mar. 14, 2016, and all the benefits accruing therefrom under 35 U.S.C. § 119, the content of which in its entirety is herein incorporated by reference.

BACKGROUND

1. Field

Exemplary embodiments of the invention relate to a liquid crystal display ("LCD") device.

2. Description of the Related Art

A liquid crystal display ("LCD") device has a wide variety of applications, such as a display for a notebook computer, a monitor, an air craft, and a space craft because of its numerous advantages such as a low operation voltage, a low power consumption, a portability, and the like.

In general, an LCD device includes a display panel, which displays an image using a transmittance of liquid crystal molecules, and a light assembly, which provides light to the display panel. The display panel includes pixels, which render different colors, and may display arbitrary colors using combinations of the colors rendered by the pixels. The pixels may display a red color, a green color, and a blue color, for example, and various colors may be displayed using combinations of the red color, the green color, and the blue color.

In addition to the pixels rendering the red color, the green color, and the blue color, pixels, which render a white color, may be additionally provided. Thus, the transmittance and a contrast ratio of the LCD device may be improved, and a power consumption of the LCD device may be lowered.

SUMMARY

Pixel electrodes, which control the transmittance of the liquid crystal molecules, are provided in the pixels, respectively. However, when the pixel electrodes are disposed too close to one another, colors from adjacent pixels may be mixed, i.e., color mixing may occur. Thus, the pixel electrodes need to be spaced apart by more than a predetermined distance, and thus, the arrangement of the pixel electrodes may be limited in areas along the edges of the pixels.

Due to the limited arrangement of the pixel electrodes, there is a limit in improving the transmittance of the pixels. Thus, a pixel electrode configuration capable of addressing this and other problems is desired.

Exemplary embodiments of the invention provide a liquid crystal display ("LCD") device having pixel electrodes capable of improving a transmittance.

However, exemplary embodiments of the invention are not restricted to those set forth herein. The above and other exemplary embodiments of the invention will become more apparent to one of ordinary skill in the art to which the invention pertains by referencing the detailed description of the invention given below.

According to an exemplary embodiment of the invention, there is provided a liquid crystal display device. The liquid crystal display device comprising first and second substrates facing each other and including a plurality of pixels, which are arranged in a form of a matrix to be adjacent to one another in a first direction and in a second direction that crosses the first direction, a liquid crystal layer interposed between the first and second substrates, a common electrode disposed on the first substrate, and pixel electrodes disposed in the plurality of pixels, respectively, over the common electrode, each of the pixel electrodes including branch electrodes, which extend in the second direction, wherein the plurality of pixels includes first pixels, which display a white color, and second pixels, which display one of a red color, a green color, and a blue color, the pixel electrodes include first pixel electrodes, which are disposed in the first pixels, respectively, and second pixel electrodes, which are disposed in the second pixels, respectively, and a first average distance between every two adjacent first and second pixel electrodes in the first direction is smaller than a second average distance between every two adjacent second pixel electrodes in the first direction.

According to another exemplary embodiment of the invention, there is provided a liquid crystal display device. The liquid crystal display device comprising first and second substrates facing each other and including a plurality of pixels, which are arranged in the form of a matrix to be adjacent to one another in a first direction and in a second direction that crosses the first direction, a liquid crystal layer interposed between the first and second substrates, a common electrode disposed on the first substrate, and pixel electrodes disposed in the plurality of pixels, respectively, over the common electrode, each of the pixel electrodes including branch electrodes, which extend in the second direction, wherein, the plurality of pixels includes first pixels, which display a white color, second pixels, which display one of a red color, a green color, and a blue color and are not adjacent to any one of the first pixels in the first direction, and third pixels, which display one of a red color, a green color, and a blue color and are adjacent to the first pixels in the first direction, the pixel electrodes include first pixel electrodes, which are disposed in the first pixels, respectively, second pixel electrodes, which are disposed in the second pixels, respectively, and third pixel electrodes, which are disposed in the third pixels, respectively, every two adjacent first and third pixel electrodes in the first direction are spaced apart by a first average distance, every two adjacent third pixel electrodes in the first direction are spaced apart by a second average distance, every two second and third pixel electrodes in the first direction are spaced apart by a third average distance, the first average distance is smaller than the second and third average distances, and the second and third average distances are identical.

According to the exemplary embodiments, an LCD device with an improved transmittance may be provided.

Other features and exemplary embodiments will be apparent from the following detailed description, the drawings, and the claims.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

The invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will filly convey the scope of the invention to those skilled in the art. The same reference numbers indicate the same components throughout the specification. In the attached figures, the thickness of layers and regions is exaggerated for clarity.

It will be understood that, although the terms first, second, third, etc., may be used herein to describe various elements, these elements should not be limited by these terms. These terms are only used to distinguish one element from another element. Thus, a first element discussed below could be termed a second element without departing from the teachings of the invention.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Hereinafter, preferred embodiments of the invention will be described in detail with reference to the accompanying drawings.

Figure 1:
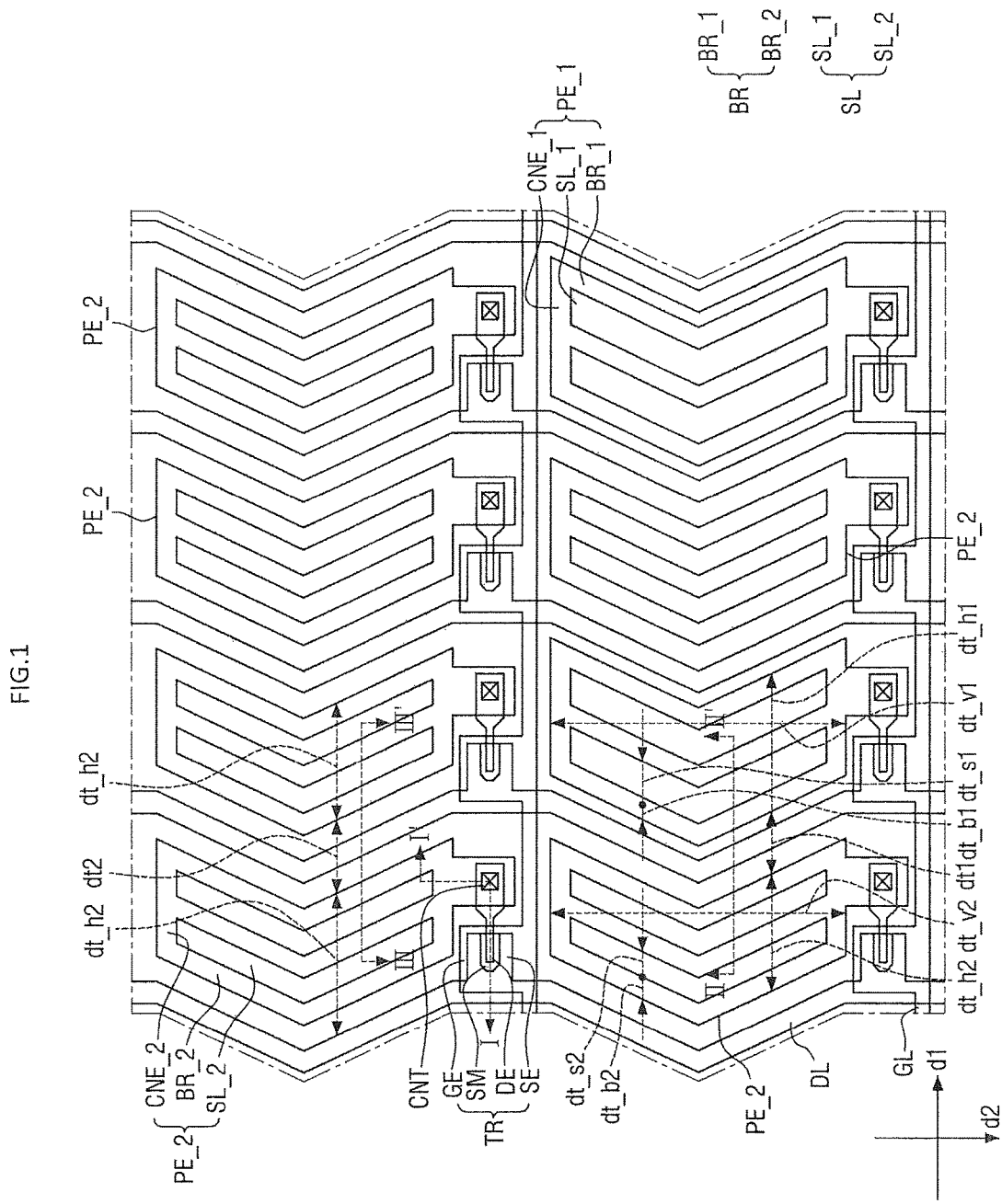
FIG. 1 is a plan view illustrating some pixels of a liquid crystal display ("LCD") device according to some exemplary embodiments of the invention.
Figure 2:
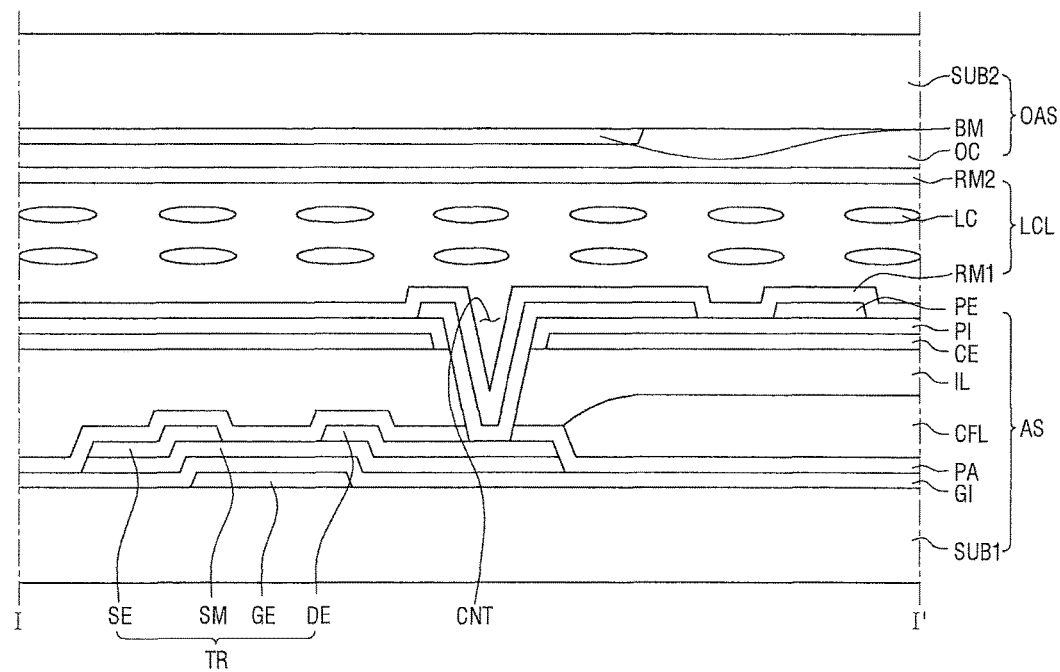
FIG. 2 is a cross-sectional view taken along line I-I' of FIG. 1.
Figure 3:
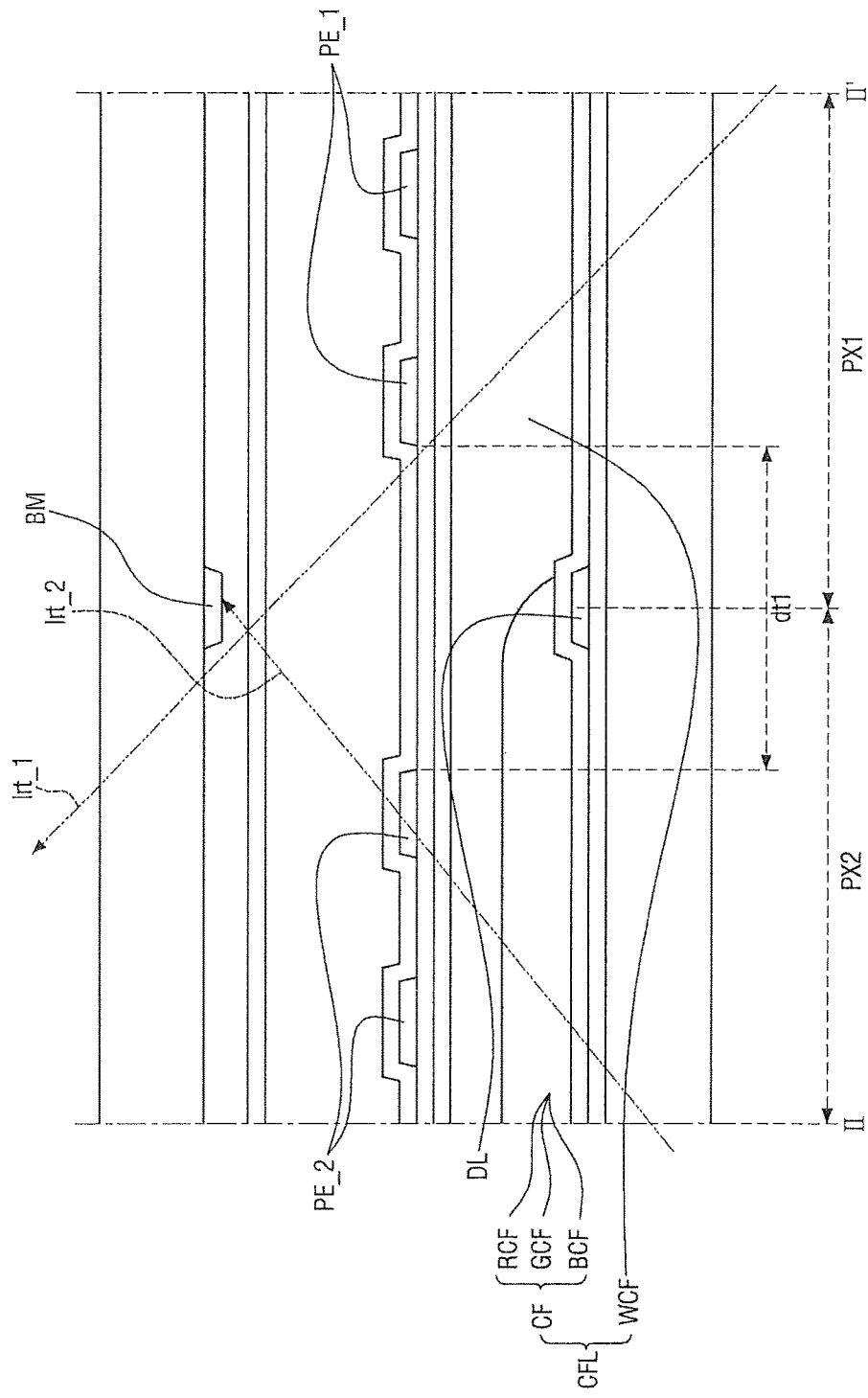
FIG. 3 is a cross-sectional view taken along line II-II' of FIG. 1.
Figure 4:
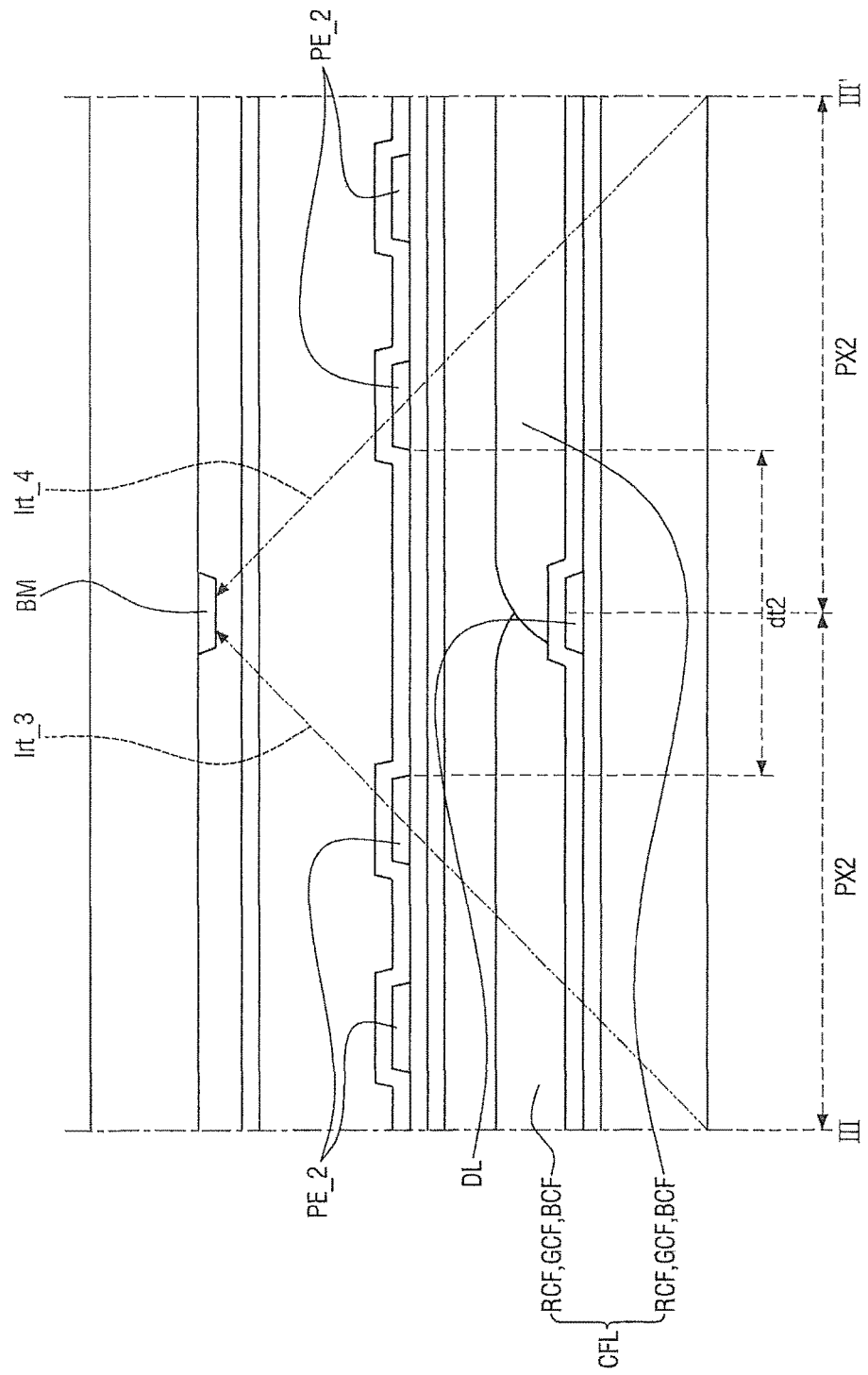
FIG. 4 is a cross-sectional view taken along line III-III' of FIG. 1.

FIG. 1 is a plan illustrating some pixels of a liquid crystal display ("LCD") device according to some exemplary embodiments of the invention, FIG. 2 is a cross-sectional view taken along line I-I' of FIG. 1, FIG. 3 is a cross-sectional view taken along line II-II' of FIG. 1, and FIG. 4 is a cross-sectional view taken along line III-III' of FIG. 1.

Referring to FIGS. 1 to 4, the LCD device according to the exemplary embodiment includes an array substrate AS, a counter substrate OAS, and a liquid crystal layer LCL.

The array substrate AS is a substrate on which thin-film transistors ("TFTs") TR for controlling liquid crystal molecules LC in the liquid crystal layer LCL are disposed, and the counter substrate OAS may be a substrate disposed to face the array substrate AS.

The array substrate AS will hereinafter be described.

The array substrate AS includes a first base substrate SUB1. The first substrate SUB1 may be a transparent insulating substrate. In an exemplary embodiment, the first base substrate SUB1 may be a glass substrate, a quartz substrate, a transparent resin substrate, or the like, for example. In an exemplary embodiment, the first base substrate SUB1 may include a polymer or a plastic material with high thermal resistance, for example. In an exemplary embodiment, the first base substrate SUB1 may be in the shape of a flat plate, for example, but may be curved in a particular direction, for example. In an exemplary embodiment, the first base substrate SUB1 may be rectangular with four sides in a plan view, for example. In an alternative exemplary embodiment, the first base substrate SUB1 may be polygonal or circular, or some of the sides of the first base substrate SUB1 may be partially curved, for example.

The first base substrate SUB1 may be a flexible substrate. That is, the first base substrate SUB1 may be deformable through rolling, folding or bending.

Gate lines GL and gate electrodes GE are disposed on the first base substrate SUB1. The gate lines GL may extend in a first direction d1. The gate lines GL and the gate electrodes GE may transmit gate signals.

The first direction d1 may be a direction parallel to one side of the first base substrate SUB1, and may be defined as a direction indicated by an arbitrary straight line extending from the left to the right of FIG. 1. However, the first direction d1 is not particularly limited to the direction parallel to one side of the first base substrate SUB1, but may be a direction indicated by a straight line extending in any particular direction with respect to the first base substrate SUB1.

The gate signals may be signals having a variable voltage, provided from an external source (not illustrated), and the turning on or off of the TFTs TR may be controlled by the voltage of the gate signals.

The gate electrodes GE may protrude from the gate lines GL and may provide the TFTs TR.

In an exemplary embodiment, the gate lines GL and the gate electrodes GE may include an aluminum (Al)-based metal such as Al or an Al alloy, a silver (Ag)-based metal such as Ag or an Ag alloy, a copper (Cu)-based metal such as Cu or a Cu alloy, a molybdenum (Mo)-based metal such as Mo or a Mo alloy, chromium (Cr), tantalum (Ta), titanium (Ti), or the like.

The gate lines GL and the gate electrodes GE may have a single-layer structure or may have a multilayer structure including two conductive films having different physical properties. In an exemplary embodiment, one of the two conductive films may include a low-resistance metal such as, for example, an Al-based metal, an Ag-based metal, a Cu-based metal, or the like, so as to prevent signal delays or voltage drops in the gate lines GL and the gate electrodes GE, and the other conductive film may include a material with excellent contact properties with respect to indium tin oxide ("ITO") and indium zinc oxide ("IZO") such as, for example, a Mo-based metal, Cr, Ti, Ta, or the like. Examples of the multilayer structure of the gate lines GL and the gate electrodes GE include the combination of a Cr lower film and an Al upper film and the combination of an Al lower film and a Mo upper film, but the invention is not limited thereto. That is, the gate lines GL and the gate electrodes GE may be provided using various metals and conductors other than those set forth herein.

A gate insulating layer GI is disposed on the gate lines GL and the gate electrodes GE. The gate insulating layer GI may insulate elements disposed therebelow, such as the gate lines GL and the gate electrodes GE, from elements disposed thereabove. That is, the gate insulating layer GI may include an insulating material. In an exemplary embodiment, the gate insulating layer GI may include silicon nitride, silicon oxide, silicon oxynitride, or a high dielectric constant material, for example. The gate insulating layer GI may have a single-layer structure or may have a multilayer structure including two insulating films having different physical properties.

Semiconductor layers SM are disposed on the gate insulating layer GI. The semiconductor layers SM may be disposed to at least partially overlap the gate electrodes GE. In an exemplary embodiment, the semiconductor layers SM may include amorphous silicon, polycrystalline silicon, or an oxide semiconductor, for example.

Ohmic contact members (not illustrated) may be further provided on the semiconductor layers SM. In an exemplary embodiment, the ohmic contact members may include n+ hydrogenated amorphous silicon doped with a high concentration of n-type impurities, or silicide, for example. The ohmic contact members may be disposed on the semiconductor layers SM in pairs. In response to the semiconductor layers SM including an oxide semiconductor, the ohmic contact members may not be provided.

Data lines DL, source electrodes SE, and drain electrodes DE are disposed on the semiconductor layers SM and the gate insulating layer GI.

The data lines DL may extend in a second direction d2. The second direction d2 may be a direction that crosses the first direction d1 at a right angle, for example, a direction indicated by an arbitrary straight line extending from the top to the bottom of FIG. 1. The data lines DL may be insulated from the gate lines GL by the gate insulating layer GI.

The data lines DL may provide data signals input thereto from an external source (not illustrated) to the source electrodes SE. The data signals may be signals having a variable voltage, provided from the external source. The gray levels of the pixels may be controlled by the data signals.

The source electrodes SE may be branched from the data lines DL and may be provided as protrusions. The source electrodes SE may receive the data signals from the data lines DL.

The drain electrodes DE may be spaced from the source electrodes SE.

In an exemplary embodiment, the source electrodes SE may be provided in a U shape, for example, to surround the drain electrodes DE, respectively, but the shape of the source electrodes SE is not limited thereto. That is, the source electrodes SE and the drain electrodes DE may be spaced apart by a predetermined distance and may extend in parallel to each other.

The semiconductor layers SM may be disposed in areas in which the drain electrodes DE and the source electrodes SE are provided to be spaced from each other. That is, the drain electrodes DE and the source electrodes SE may partially overlap or contact the semiconductor layers SM or may face each other with the semiconductor layers SM disposed therebetween.

In an exemplary embodiment, the data lines DL, the source electrodes SE, and the drain electrodes DE may include Al, Cu, Ag, Mo, Cr, Ti, Ta or an alloy thereof, for example. In an exemplary embodiment, the data lines DL, the source electrodes SE, and the drain electrodes DE may have a multilayer structure including a lower film (not illustrated) including a refractory metal and a low-resistance upper (not illustrated) film disposed on the lower film, for example.

The gate electrodes GE, the source electrodes SE, and the drain electrodes DE may provide the TFTs TR together with the semiconductor layers SM.

The TFTs TR may electrically connect the source electrodes SE and the drain electrodes DE according to the voltage of the gate signals provided to the gate electrodes GE. More specifically, when the voltage of the gate signals provided to the gate electrodes GE is a voltage for turning off the TFTs TR, the source electrodes SE and the drain electrodes DE are not electrically connected. When the voltage of the gate signals provided to the gate electrodes GE is a voltage for turning on the TFTs TR, the source electrodes SE and the drain electrodes DE are electrically connected via channels provided in the semiconductor layers SM.

The channels are provided mainly in parts of the semiconductor layers SM in areas between the source electrodes SE and the drain electrodes DE. That is, in a case in which the TFTs TR are in an on-state, the channels are provided mainly in the parts of the semiconductor layers SM in the areas between the source electrodes SE and the drain electrodes DE, and thus, voltages and currents may be transmitted.

As a result, the data signals provided to the data lines DL may also be transmitted to elements other than the semiconductor layers SM connected to the drain electrodes DE, and the transmission of the data signals may be controlled by the gate signals provided to the gate lines GL.

A passivation layer PA is disposed on the data lines DL, the source electrodes SE, the drain electrodes DE, and the semiconductor layers SM. In an exemplary embodiment, the passivation layer PA may include an inorganic insulating material, for example, and may cover and protect the data lines DL and the TFTs TR, which are disposed below the passivation layer PA.

A color filter layer CFL is disposed on the passivation layer PA. The color filter layer CFL includes a plurality of color filters CF. The color filters CF may allow the transmission of particular wavelength band components of light incident from the outside of the first base substrate SUB1 and may block the transmission of other wavelength band components, thereby allowing light emitted out of the second base substrate SUB2 to be tinged with a particular color.

In an exemplary embodiment, red color filters RCF, which are color filters CF that make a red color visible, transmit light in a wavelength band of about 580 nanometers (nm) to about 780 nm therethrough and absorb (and/or reflects) light in the other wavelength bands, green color filters GCF, which are color filters CF that make a green color visible, transmit light in a wavelength band of about 450 nm to about 650 nm therethrough and absorb (and/or reflects) light in the other wavelength bands, and blue color filters BCF, which are color filters CF that make a blue color visible, transmit light in a wavelength band of about 380 nm to about 560 nm therethrough and absorb (and/or reflects) light in the other wavelength bands, for example. The red color filters RCF may include a pigment or a photosensitive organic material rendering a red color, the green color filters GCF may include a pigment or a photosensitive organic material rendering a green color, and the blue color filters BCF may include a pigment or a photosensitive organic material rendering a blue color.

The color filters CF may be disposed in the pixels, respectively, or may not be disposed in some of the pixels. That is, in an example, the color filters CF may not be provided in some of the pixels, in which case, the pixels where the color filters CF are not provided may be filled with a planarization layer IL, which is disposed on the color filter layer CFL, instead of the color filter layer CFL. The pixels where the color filters CF are not provided may transmit all wavelength components of light therethrough and may thus appear in white.

However, the invention is limited to this example. That is, in another exemplary embodiment, a transparent layer of white color filters WCF, instead of the planarization layer IL, may be provided in the pixels where the color filters CF are not provided at the locations where the color filters CF are supposed to be provided. In the following description, parts of pixels that are filled with the planarization layer IL, instead of the color filters CF, will hereinafter be referred to as the white color filters WCF.

The color of the pixels may be determined by the structure and the material of the color filter layer CFL. In the exemplary embodiment, the red color filters RCF, the green color filters GCF, the blue color filters BCF, and the white color filters WCF may all be provided in the color filter layer CFL. Thus, the pixels include red pixels, green pixels, blue pixels, and white pixels.

In general, by additionally providing the white pixels to a pixel array including the red pixels, the green pixels, and the blue pixels, the transmittance and contrast ratio of the LCD device according to the exemplary embodiment may be improved, and at the same time, the power consumption of the LCD device according to the exemplary embodiment may be reduced. An improvement in the transmittance of the LCD device according to the exemplary embodiment by the addition of the white pixels may become more apparent when the LCD device according to the exemplary embodiment displays a white image.

More specifically, the white pixels transmit light therethrough only when a white image is displayed. That is, in a case in which a non-white image is to be displayed, only the red pixels, the green pixels, and the blue pixels transmit light therethrough to display the non-white image. In a case in which a white image is to be displayed, not only the red pixels, the green pixels, and the blue pixels, but also the white pixels, transmit light therethrough. Since the white pixels are excluded from the selection of particular wavelength bands by the color filters CF, the white pixels may have a higher transmittance than the red pixels, the green pixels, and the blue pixels, and as a result, the general transmittance of the LCD device according to the exemplary embodiment may be improved.

Each unit pixel PXU (refer to FIG. 9) includes four pixels that are grouped together, for example. In an exemplary embodiment, each unit pixel PXU may include a red pixel, a green pixel, a blue pixel, and a white pixel, for example. Two of the four pixels of each unit pixel PXU may be arranged side-by-side in the first direction d1, and the other two pixels may be arranged side-by-side in the second direction d2. Also, each unit pixel PXU may display an arbitrary color by combining a red pixel, a green pixel, a blue pixel, and a white pixel, and the luminance of each unit pixel PXU may be controllable. A plurality of unit pixels PXU may be arranged in the first direction d1 and in the second direction d2 in the form of a matrix.

In an exemplary embodiment, FIG. 1 illustrates an example in which a total of eight pixels are arranged in the form of a matrix with two rows and four columns, for example. The pixel in the second row and the second column and the pixel in the second row and the fourth column may be first pixels PX1, and the other six pixels, i.e., the pixel in the first row and the first column, the pixel in the first row and the second column, the pixel in the first row and the third column, the pixel in the first row and the fourth column, the pixel in the second row and the first column, and the pixel in the second row and the third column, may be second pixels PX2.

A total of four pixels including two pixels from two adjacent rows and two pixels from two adjacent columns may provide a single unit pixel PXU.

More specifically, the first pixel PX1 in the second row and the second column, the second pixel PX2 in the first row and the first column, the second pixel PX2 in the first row and the second column, and the second pixel PX2 in the second row and the first column may provide a unit pixel PXU together.

Similarly, the first pixel PX1 in the second row and the fourth column, the second pixel PX2 in the first row and the third column, the second pixel PX2 in the first row and the fourth column, and the second pixel PX2 in the second row and the third column may provide a unit pixel PXU together.

Since the two unit pixels PXU illustrated in FIG. 1 have the same structure, the LCD device according to the exemplary embodiment will hereinafter be described, taking the unit pixel PXU including the pixel in the first row and the first column, the pixel in the first row and the second row, the pixel in the second row and the first column, and the pixel in the second row and the second column, as an example, and descriptions of other unit pixels PXU will be omitted.

In the exemplary embodiment, the color filter layer CFL is disposed adjacent to the array substrate AS, but the invention is not limited thereto. That is, the color filter layer CFL may be disposed adjacent to the counter substrate OAS, in which case, the color filter layer CFL may be disposed close to light-shielding members BM that will be described later.

The planarization layer IL is disposed on the color filter layer CFL. The planarization layer IL may planarize the tops of the passivation layer PA and the color filter layer CFL where height differences are generated due to the presence of the gate lines GL, the data lines DL, and the TFTs TR. The planarization layer IL may include an organic material. In an exemplary embodiment, the planarization layer IL may include a photosensitive organic composition, for example. In another exemplary embodiment, the planarization layer IL may not be provided.

Contact holes CNT, which expose parts of the TFTs TR, particularly, parts of the drain electrodes DE, may be defined in the planarization layer IL and the passivation layer PA.

The contact holes CNT may be provided to vertically penetrate the planarization layer IL and the passivation layer PA. The contact holes CNT may be provided to expose parts of the drain electrodes DE and at the same time, overlap parts of the drain electrodes DE. The contact holes CNT may be defined in the pixels, respectively.

Although not specifically illustrated, in a case in which the color filter layer CFL is disposed to overlap the TFTs TR, the contact holes CNT may penetrate the color filter layer CFL. The contact holes CNT may be defined by providing the passivation layer PA, the color filter layer CFL, and the planarization layer IL and then patterning the passivation layer PA, the color filter layer CFL, and the planarization layer IL. Parts of the drain electrodes DE may be physically and electrically connected to some elements on planarization layer IL via conductive materials provided in the contact holes CNT. The conductive materials provided in the contact holes CNT may be parts of pixel electrodes PE that will be described later.

A common electrode CE is disposed on the planarization layer IL. The common electrode CE may be provided in the form of a surface in the entire area except for areas where the contact holes CNT are defined. In an exemplary embodiment, the common electrode CE may include a transparent conductive material such as ITO, IZO, indium tin zinc oxide ("ITZO"), or aluminum-doped zinc oxide ("AZO"). A common voltage may be applied to the common electrode CE, and thus, the common electrode CE may generate an electric field together with the pixel electrodes PE.

A pixel insulating layer PI is disposed on the common electrode CE. In an exemplary embodiment, the pixel insulating layer PI may include an inorganic insulating material. The pixel insulating layer PI may insulate the common electrode CE, which is disposed below the pixel insulating layer PI, from the pixel electrodes PE, which is disposed on the pixel insulating layer PI. Accordingly, an electric field may be provided by a difference between the voltage applied to the common electrode CE and the voltage applied to the pixel electrodes PE.

The pixel electrodes PE are disposed on the pixel insulating layer PI. Parts of the pixel electrodes PE may be physically connected to the drain electrodes DE via the contact holes CNT and may thus receive the data signals from the drain electrodes DE. In an exemplary embodiment, the pixel electrodes PE may include a transparent conductive material such as ITO, IZO, ITZO, or AZO. The pixel electrodes PE may be provided to be divided from one another for the respective pixels, whereas the common electrode CE is provided as a surface or plane without regard to the distinction between the pixels.

Each of the pixel electrodes PE includes a plurality of branch electrodes BR and a plurality of connecting electrodes CNE, which connect the branch electrodes BR. The branch electrodes BR extend in a similar direction to the second direction d2. The similar direction to the second direction d2 may be a direction having an absolute crossing angle of less than 45° with the second direction d2.

The branch electrodes BR may be spaced from one another and may extend in parallel to one another. Slits SL, which are openings in which no transparent conductive material is disposed, are defined among the branch electrodes BR. The branch electrodes BR, the slits SL, and the common electrode CE may interact with one another to generate an electric field having a particular directionality, and the liquid crystal molecules LC in the liquid crystal layer LCL may be controlled by the electric field.

The connecting electrode CNE may extend in the first direction d1, and electrically and physically connect the branch electrodes BR. Thus, in response to a voltage being provided to one of the branch electrodes BR or one of the connecting electrodes CNE, the voltage may be transmitted to all the other branch electrodes BR and all the other connecting electrodes CNE.

Figure 9:
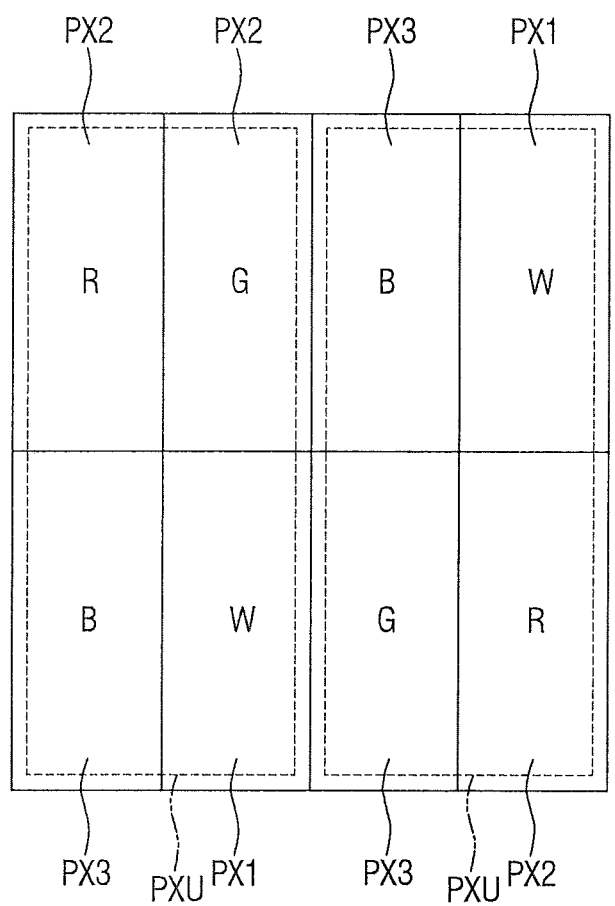
FIG. 9 is a schematic view illustrating some pixels of the LCD device according to the exemplary embodiment of FIG. 8.

The pixels include the first pixels PX1 (refer to FIG. 9) and the second pixels PX2 (refer to FIG. 9). The pixels may be classified into the first pixels PX1 and the second pixels PX2 according to the structure and the material of the color filter layer CFL. In an exemplary embodiment, the white pixels may be defined as the first pixels PX1, and the red pixels, the green pixels, and the blue pixels may be defined as the second pixels PX2.

Pixel electrodes PE disposed in the first pixels PX1 will hereinafter be referred to as first pixel electrodes PE_1, and pixel electrodes PE disposed in the second pixels PX2 will hereinafter be referred to as second pixel electrodes PE_2. That is, the pixels of the LCD device according to the exemplary embodiment include the first pixels PX1 and the second pixels PX2, and the pixels PE of the LCD device according to the exemplary embodiment include the first pixel electrodes PE_1 and the second pixel electrodes PE_2. The first pixel electrodes PE_1 correspond to the pixel electrodes PE disposed in the first pixels PX1, and the second pixel electrodes PE_2 correspond to the pixel electrodes PE disposed in the second pixels PX2.

When two adjacent pixels in the first direction d1 are a first pixel electrode PE_1 and a second pixel electrode PE_2, the first pixel electrode PE_1 and the second pixel electrode PE_2 may be spaced apart by a first average distance dt1. When two adjacent pixels in the first direction d1 are two second pixel electrodes PE_2, the two second pixel electrodes PE_2 may be spaced apart by a second average distance dt2. The first average distance dt1 may be smaller than the second average distance dt2.

That is, the distance between every two adjacent first and second pixel electrodes PE_1 and PE_2 may be smaller than the distance between every two adjacent second pixel electrodes PE_2. Thus, the control over the liquid crystal molecules LC may be stronger in an area between every two adjacent first and second pixel electrodes PE_1 and PE_2 than in an area between every two adjacent second pixel electrodes PE_2. Due to such regional difference in the control over the liquid crystal molecules LC, the transmittance of the LCD device according to the exemplary embodiment may be improved.

Average distances such as the first average distance dt1 and the second average distance dt2 are used in consideration of the arrangement of large numbers of first pixel electrodes PE_1 and second pixel electrodes PE2 throughout the entire LCD device according to the exemplary embodiment. Thus, although not specifically illustrated, some exceptional first pixel electrodes PE_1 and some exceptional second pixel electrodes PE_2 may have a different arrangement from other first pixel electrodes PE_1 and other second pixel electrodes PE_2, but in general may still be able to satisfy the condition that the first average distance dt1 be smaller than the second average distance dt2. The exceptional first pixel electrodes PE_1 and the exceptional second pixel electrodes PE_2 may be the pixel electrodes PE of pixels disposed on the outermost edges of the pixel array in the form of a matrix or may be the pixel electrodes PE of pixels provided to have an exceptional arrangement from other pixels because of some error made during the fabrication of the LCD device according to the exemplary embodiment. For convenience, not the arrangement of the exceptional first pixel electrodes PE_1 and the exceptional second pixel electrodes PE_2, but the arrangement of non-exceptional first pixel electrodes PE_1 and non-exceptional second pixel electrodes PE_2, is illustrated. Various lengths mentioned herein such as, for example, first and second horizontal average lengths and first and second vertical average lengths that will be described later, may be average lengths obtained by taking all the pixels into consideration.

The transmittance of the LCD device according to the exemplary embodiment may be higher in areas between the first pixel electrodes PE_1 and the respective neighboring data lines DL than in areas between the second pixel electrodes PE_2 and the respective neighboring data lines DL.

More specifically, elements such as the data lines DL and the light-shielding members BM that may interfere with the transmission of light may be disposed in an area between every two adjacent first and second pixel electrodes PE_1 and PE_2 and in an area between every two adjacent second pixel electrodes PE_2. An improvement in the transmittance of the LCD device according to the exemplary embodiment can be achieved, even with the presence of such light transmission-interfering elements, because the distances from the first pixel electrodes PE_1 to the respective neighboring data lines DL or light-shielding members BM is smaller than the distances from the second pixel electrodes PE_2 to the respective neighboring data lines DL or light-shielding members BM, and as a result, the control of the first pixels PX1 over the liquid crystal molecules LC is stronger than the control of the second pixels PX2 over the liquid crystal molecules LC.

The distance between every two adjacent second pixel electrodes PE_2 may not be as short as the distance between every two adjacent first and second pixel electrodes PE_1 and PE_2 because of the risk of color mixing.

To prevent color mixing among the pixels, the pixel electrodes PE of the pixels need to be spaced apart by a predetermined distance. In the exemplary embodiment, the second average distance dt2 may be the same as a minimum distance for preventing color mixing.

The term "color mixing", as used herein, denotes a phenomenon in which colors from adjacent pixels are mixed and viewed together. When color mixing occurs, some unintended colors may be displayed. As a result, the precision of color reproducibility may be lowered, i.e., the display quality of the LCD device according to the exemplary embodiment may be lowered. To minimize the occurrence of color mixing, the pixel electrodes PE may be designed to be spaced apart by a predetermined distance. Also, the light-shielding members BM, which are disposed among the pixel electrodes PE, may be designed to have at least a predetermined width. The transmittance of the LCD device according to the exemplary embodiment may be improved by reducing the distance between the pixel electrodes PE of every two adjacent pixels, but the likelihood of color mixing may increase, leading to degradation of the display quality of the LCD device according to the exemplary embodiment. In an exemplary embodiment, in a typical LCD device, the pixel electrodes of every two adjacent pixels may be spaced apart by more than about 9.3 micrometers (μm), and when the pixel electrodes of every two adjacent pixels are spaced apart by about 9.3 μm or less, for example, color mixing may become apparent, and thus, the display quality may be lowered. In an exemplary embodiment, an LCD device in which a minimum distance by which the pixel electrodes of every two adjacent pixels are spaced apart is about 9.3 μm may be an 806-ppi LCD device, for example.

In the exemplary embodiment, even with the aforementioned restrictions, the distance between the pixel electrodes PE of some pixels may be about 9.3 μm or less, for example.

More specifically, every two adjacent first and second pixel electrodes PE_1 and PE_2 may be designed to be spaced apart by the first average distance dt1, which is smaller than the minimum distance for preventing color mixing, i.e., the second average distance dt2.

In an exemplary embodiment, the second average distance dt2 may be, for example, about 9.3 μm, but the invention is not limited thereto. That is, the second average distance dt2 may not be about 9.3 μm depending on the design of the LCD device according to the exemplary embodiment. Even in this case, the second average distance dt2 may still satisfy the condition that it be larger than the first average distance dt1.

As illustrated in FIG. 4, every two adjacent second pixel electrodes PE_2 may be spaced apart by the second average distance dt2 to prevent color mixing. As illustrated in FIG. 3, every two adjacent first and second pixel electrodes PE_1 and PE_2 may be spaced apart by the first average distance dt1, which is smaller than the second average distance dt2, regardless of color mixing. The principles that make this configuration possible will hereinafter be described with reference to FIGS. 3 and 4. First through fourth optical paths Irt1 through Irt4 of FIGS. 3 and 4 are paths that incident light may take traveling from the bottom to the top of the LCD device according to the exemplary embodiment.

Referring to the first optical path Irt1 of FIG. 3, light incident from the bottom of a first pixel PX1 may be emitted toward the top of a second pixel PX2. Thus, the light traveling along the first optical path Irt1 may improve the transmittance of the LCD device according to the exemplary embodiment without causing color mixing.

In an exemplary embodiment, the first pixel PX1 corresponds to a white pixel, and the second pixel PX2 corresponds to one of a red pixel, a green pixel, and a blue pixel, for example. In the LCD device according to the exemplary embodiment, white pixels transmit light therethrough only when a white color is displayed. When a white color is displayed, red pixels, green pixels, and blue pixels all transmit light therethrough. Consequently, the first pixel PX1 and the second pixel PX2 may operate in two modes, i.e., a first mode in which the first pixel PX1 and the second pixel PX2 both transmit light therethrough to display a white color and a second mode in which the first pixel PX1 does not transmit light therethrough but only the second pixel PX2 transmits light therethrough to display a non-white color.

The mode in which the first pixel PX1 and the second pixel PX2 both transmit light therethrough, i.e., the first mode, will hereinafter be described. In a case in which light incident from the bottom of the first pixel PX1 is emitted toward the top of the second pixel PX2, i.e., in a case in which the incident light travels along the first optical path Irt1, the transmittance of the second pixel PX2 may be improved because the first pixel PX1 is a white pixel in which a white color filter WCF is disposed and because the incident light traveling along the first optical path Irt1 is white light that does not cause color mixing, but only contributes to the improvement of a transmittance.

In a case in which light incident upon the bottom of the second pixel PX2 travels toward the top of the first pixel PX1, i.e., in a case in which the incident light travels along the second optical path Irt2, the incident light is blocked by a light-shielding member BM between the first pixel PX1 and the second pixel PX2. Thus, no color mixing occurs because the first average distance dt1 is smaller than the second average distance dt2 and the position of a second pixel electrode PE_2 is uniform not only for the second pixel PX2, but also for other second pixels PX2. The first average distance dt1 is smaller than the second average distance dt2 because the edges of a first pixel electrode PE_1 are closer to the edges of the first pixel PX1 than the edges of the second pixel electrode PE_2 are to the edges of the second pixel PX2. Thus, an improvement in a transmittance may be achieved by the first pixel PX1, but no color mixing may be caused by the second pixel PX2. The mode in which the first pixel PX1 does not transmit light therethrough but only the second pixel PX2 transmits light therethrough, i.e., the second mode, will hereinafter be described. Most of light incident upon the bottom of the first pixel PX1 does not penetrate the LCD device according to the exemplary embodiment because of the polarization state of part of the liquid crystal layer LCL corresponding to the first pixel PX1, which is in an off-state. However, some of the incident light may travel along the first optical path Irt1 and may be emitted toward the top of the second pixel PX2. The light traveling along the first optical path Irt1 is light transmitted through the white color filter WCF and thus corresponds to white light. Thus, the light traveling along the first optical path Irt1 may improve the transmittance of the LCD device according to the exemplary embodiment without causing color mixing with the second pixel PX2.

In a case in which light incident upon the second pixel PX2 travels toward the top of the first pixel PX1, i.e., in a case in which the incident light travels along the second optical path Irt2, the incident light is blocked by the light-shielding member BM between the first pixel PX1 and the second pixel PX2. Thus, no color mixing occurs because the first average distance dt1 is smaller than the second average distance dt2 and the position of the second pixel electrode PE_2 is uniform not only for the second pixel PX2, but also for other second pixels PX2, as discussed above with regard to the first mode. The first average distance dt1 is smaller than the second average distance dt2 because the edges of the first pixel electrode PE_1 are closer to the edges of the first pixel PX1 than the edges of the second pixel electrode PE_2 are to the edges of the second pixel PX2.

In conclusion, as mentioned above, the first average distance dt1 may be set to be smaller than the second distance dt2 and may be, for example, 9.3 μm or less, for example. Even when the first average distance dt1 is smaller than the second average distance dt2, there may be a limit in improving a transmittance because a data line DL disposed between the first pixel electrode PE_1 and the second pixel electrode PE_2 has a predetermined width and includes a metal that does not transmit light therethrough. Thus, the first average distance dt1 may be set to be about half a minimum second average distance of 9.3 μm, i.e., to be in the range of 4.5 μm and 4.7 μm, in which case, the improvement in a transmittance may be maximized.

Referring again to FIG. 1, the first pixel electrodes PE_1 have a different shape from the second pixel electrodes PE_2. More specifically, a first average horizontal length dt_h1 of the first pixel electrodes PE_1, which is an average of the lengths of the first pixel electrodes PE_1 in the first direction d1, and a second average horizontal length dt_h2 of the second pixel electrodes PE_2, which is an average of the lengths of the second pixel electrodes PE_2 in the first direction d1, may differ from each other because, as described above, the first average distance dt1 and the second average distance dt2 may differ from each other. That is, the first horizontal average length dt_h1 may be longer than the second average horizontal length dt_h2. The first average horizontal length dt_h1 is the maximum of lengths of the first pixel electrodes PE1 in a direction parallel to the first direction d1, measured from multiple arbitrary points on the first pixel electrodes PE1. Similarly, the second average horizontal length dt_h2 is the maximum of lengths of the second pixel electrodes PE2 in the direction parallel to the first direction d1, measured from multiple arbitrary points on the second pixel electrodes PE2.

A first average vertical length dt_v1 of the first pixel electrodes PE_1, which is an average of the lengths of the first pixel electrodes PE_1 in the second direction d2, and a second average vertical length dt_v2 of the second pixel electrodes PE_2, which is an average of the lengths of the second pixel electrodes PE_2 in the second direction d2, may be identical because the distance between every two adjacent pixel electrodes PE in the second direction d2 may be uniform regardless of the distinctions between the first pixel electrodes PE_1 and the second pixel electrodes PE_2. The first average vertical length dt_v1 is the maximum of lengths of the first pixel electrodes PE1 in a direction parallel to the second direction d2, measured from multiple arbitrary points on the first pixel electrodes PE1. Similarly, the second average vertical length dt_v2 is the maximum of the lengths of the second pixel electrodes PE2 in the direction parallel to the second direction d2, measured from multiple arbitrary points on the second pixel electrodes PE2.

Even when the first average horizontal length dt_h1 and the second average horizontal length dt_h2 differ from each other, the number of branch electrodes BR_1 included in each of the first pixel electrodes PE_1 may be the same as the number of branch electrodes BR_2 included in each of the second pixel electrodes PE_2, the number of slits SL_1 included in each of the first pixel electrodes PE_1 may be the same as the number of slits SL_2 included in each of the second pixel electrodes PE_2, and the number of connecting electrodes CNE_1 included in each of the first pixel electrodes PE_1 may be the same as the number of connecting electrodes CNE_2 included in each of the second pixel electrodes PE_2.

Since the first average horizontal length dt_h1 and the second average horizontal length dt_h2 differ from each other, a first slit length dt_s1, which is the length of the slits SL_1 of each of the first pixel electrodes PE_1 in the first direction d1, and a second slit length dt_s2, which is the length of the slits SL_2 of each of the second pixel electrodes PE_2 in the first direction d1, may differ from each other. That is, the first slit length dt_s1 may be longer than the second slit length dt_s2. In a case in which the first slit length dt_s1 and the second slit length dt_s2 differ from each other, a first branch length dt_b1, which is the length of the branch electrodes BR_1 of each of the first pixel electrodes PE_1 in the first direction d1, and a second branch length dt_b2, which is the length of the branch electrodes BR_2 of each of the second pixel electrodes PE_2 in the first direction d1, may be identical.

In an alternative exemplary embodiment, although not specifically illustrated, the first slit length dt_s1 and the second slit length dt_s2 may be identical. In this case, the first branch length dt_b1 and the second branch length dt_B2 may differ from each other, the first slit length dt_s1 and the second slit length dt_s2 may differ from each other, and the first branch length dt_b1 and the second branch length dt_b2 may differ from each other.

The exemplary embodiment has been described, taking, as examples, the case in which a first pixel electrode PE_1 and a second pixel electrode PE_2 are disposed adjacent to each other and the case in which two second pixel electrodes PE_2 are disposed adjacent to each other, but the invention is not limited thereto. That is, there may also be a case in which two first pixel electrodes PE_1 are disposed adjacent to each other. In the case in which two first pixel electrodes PE_1 are disposed adjacent to each other, the distance between the two adjacent first pixel electrodes PE_1 may be the same as, or smaller than, the first average distance dt1. Since the first pixels PX1 are all white pixels and display the same color, no color mixing occurs. Thus, the first pixel electrodes PE_1 may be disposed close to one another with no particular restriction on the distance therebetween for preventing color mixing.

The counter substrate OAS will hereinafter be described.

The counter substrate OAS includes a second base substrate SUB2, the light-shielding members BM, and an overcoat layer OC.

The second base substrate SUB2 is disposed to face the first base substrate SUB1. The second base substrate SUB2 may be durable enough to withstand external shock. The second base substrate SUB2 may be a transparent insulating substrate. In an exemplary embodiment, the second base substrate SUB2 may be a glass substrate, a quartz substrate, a transparent resin substrate, or the like, for example. In an exemplary embodiment, the second base substrate SUB2 may include a polymer or a plastic material with high thermal resistance, for example. In an exemplary embodiment, the second base substrate SUB2 may be in the shape of a flat plate, for example, but may be curved in a particular direction.

In some exemplary embodiments, the second base substrate SUB2 may be a flexible substrate. That is, the second base substrate SUB2 may be deformable through rolling, folding or bending.

The light-shielding members BM may be disposed on the second base substrate SUB2 (e.g., below the second base substrate SUB2 in FIG. 2). The light-shielding members BM may be disposed to overlap the TFTs TR of the pixels, the data lines DL, and the gate lines GL. The light-shielding members BM may prevent the TFTs TR of the pixels, the data lines DL, the gate lines GL, and other elements from being viewed by a user due to the reflection of light, and may also prevent light leakage that may be caused by a misalignment of the liquid crystal molecules LC.

The overcoat layer OC is disposed on the light-shielding members BM (e.g., below the light-shielding members BM in FIG. 2). The overcoat layer OC may protect the light-shielding members BM and may planarize any height differences generated by the light-shielding members BM. The overcoat layer OC may not be provided depending on the shape and the material of the light-shielding members BM.

The liquid crystal layer LCL will hereinafter be described.

The liquid crystal layer LCL includes the liquid crystal molecules LC, which have dielectric anisotropy. In an exemplary embodiment, the liquid crystal molecules LC may be horizontal alignment-type liquid crystal molecules LC, for example, aligned between the array substrate AS and the counter substrate OAS in a horizontal direction with respect to both the array substrate AS and the counter substrate OAS. In response to an electric field being provided between the array substrate AS and the counter substrate OAS, the liquid crystal molecules LC may rotate in a particular direction between the array substrate AS and the counter substrate OAS and may thus change the polarization state of light passing through the liquid crystal layer LCL. The pixels may allow or block the transmission of light therethrough according to a change in the polarization state of light that occurs in the liquid crystal layer LCL.

The liquid crystal layer LCL may further include an upper alignment layer RM2 and a lower alignment layer RM1 to pretilt the liquid crystal layers LC. The upper alignment layer RM2 may be disposed below the overcoat layer OC, and the upper alignment layer RM1 may be disposed above the pixel electrodes PE. In an exemplary embodiment, the upper and lower alignment layers RM1 and RM2 may align the liquid crystal molecules LC in a particular direction with respect to a plane on which the lower alignment layer RM1 is provided, to define an angle of about 0.5° to about 3° with respect to a perpendicular direction to the plane on which the lower alignment layer RM1 is disposed. One or both of the upper and lower alignment layers RM1 and RM2 may not be provided. The liquid crystal molecules LC may be pretilted, without the aid of the upper and lower alignment layers RM1 and RM2, because of their own physical properties.

Due to the interactions among the array substrate AS, the counter substrate OAS, and the liquid crystal layer LCL, the LCD device according to the exemplary embodiment may display an image. Also, due to the structure of the first pixel electrodes PE_1 and the structure of the second pixel electrodes PE_2, color mixing may be prevented, and at the same time, the transmittance of the LCD device according to the exemplary embodiment may be improved.

Figure 5:
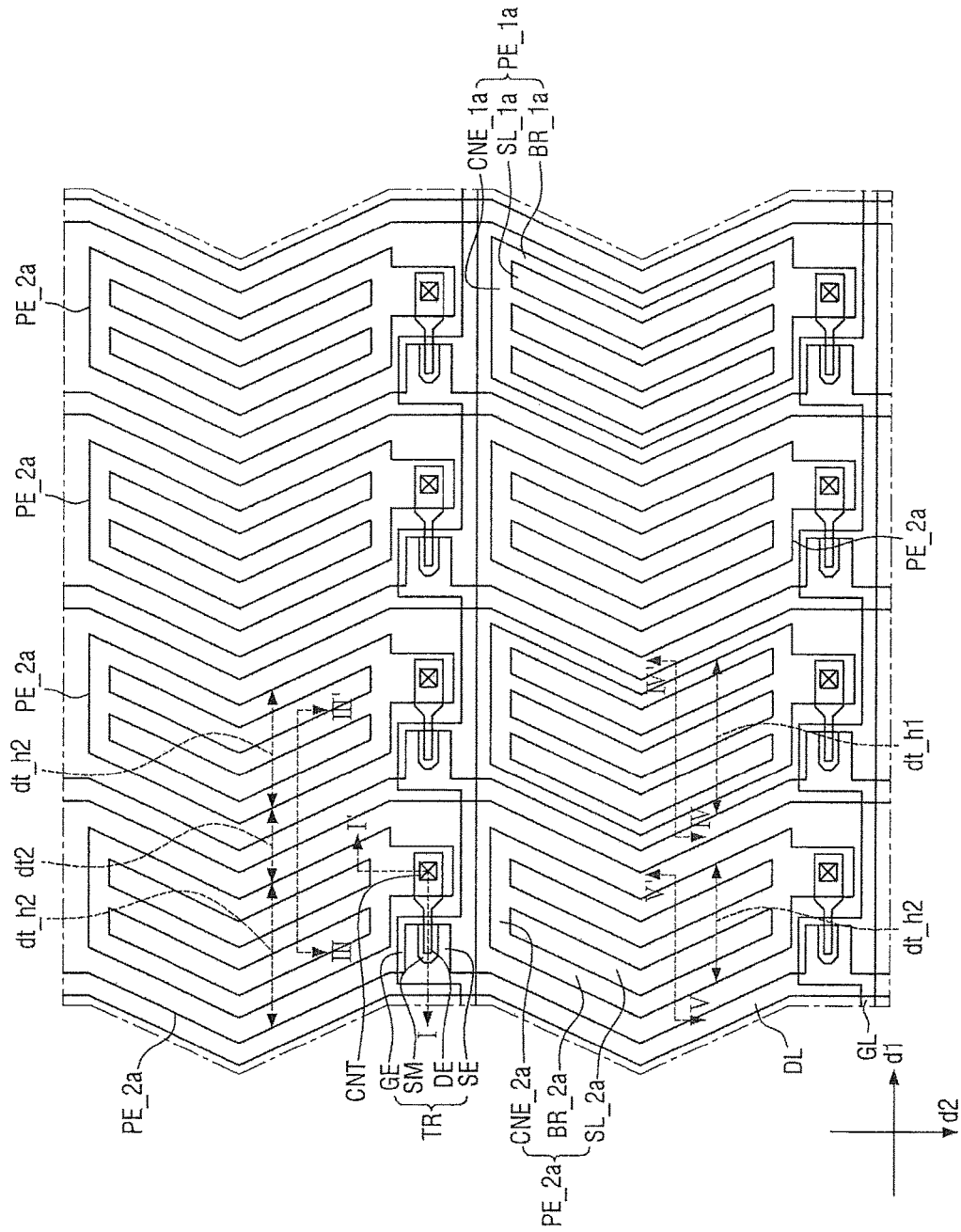
FIG. 5 is a plan view illustrating some pixels of an LCD device according to some other exemplary embodiments of the invention.

FIG. 5 is a plan view illustrating some pixels of an LCD device according to some other exemplary embodiments of the invention.

In the exemplary embodiments of FIGS. 1 and 5, like reference numerals indicate like elements, and thus, descriptions thereof will be omitted or at least simplified.

The exemplary embodiment of FIG. 5 differs from the exemplary embodiment of FIG. 1 in the shape of first pixel electrodes PE_1a.

In the exemplary embodiment of FIG. 1, the number of branch electrodes BR_1 of each of the first pixel electrodes PE_1 is the same as the number of branch electrodes BR_2 of each of the second pixel electrodes PE_2, and the number of slits SR_1 of each of the first pixel electrodes PE_1 is the same as the number of slits SR_2 of each of the second pixel electrodes PE_2. In the exemplary embodiment of FIG. 5, the number of branch electrodes BR_1a of each of the first pixel electrodes PE_1a differs from the number of branch electrodes BR_2a of each of second pixel electrodes PE_2a, and the number of slits SR_1a of each of the first pixel electrodes PE_1a differs from the number of slits SR_2a of each of the second pixel electrodes PE_2a.

That is, in the exemplary embodiment of FIG. 5, the number of branch electrodes BR_1a *of each of the first pixel electrodes PE_1a* may be larger than the number of branch electrodes BR_2a of each of the second pixel electrodes PE_2a , and the number of slits SR_1a of each of the first pixel electrodes PE_1a may be larger than the number of slits SR_2a of each of the second pixel electrodes PE_2a.

Thus, the first pixel electrodes PE_1a may have a larger area than the second pixel electrodes PE_2a . Accordingly, the first pixel electrodes PE_1a may have a higher transmittance than the second pixel electrodes PE_2a.

The first and second pixel electrodes PE_1a and PE_2a may further include the first and second connecting electrodes CNE_1a and CNE_$_2$a , respectively.

In the exemplary embodiment of FIG. 5, like in the exemplary embodiment of FIG. 1, a first average horizontal length dt_h1 may be longer than a second average horizontal length dt_h2. Thus, as mentioned above with regard to the exemplary embodiment of FIG. 1, the control over the liquid crystal molecules LC in areas between the first pixel electrodes PE_1a and the second pixel electrodes PE_2a may be improved, and as a result, the transmittance in the areas between the first pixel electrodes PE_1a and the second pixel electrodes PE_2a may be improved.

The improvement of a transmittance by the exemplary embodiment of FIG. 5 will hereinafter be described with reference to FIGS. 6 and 7.

Figure 6:
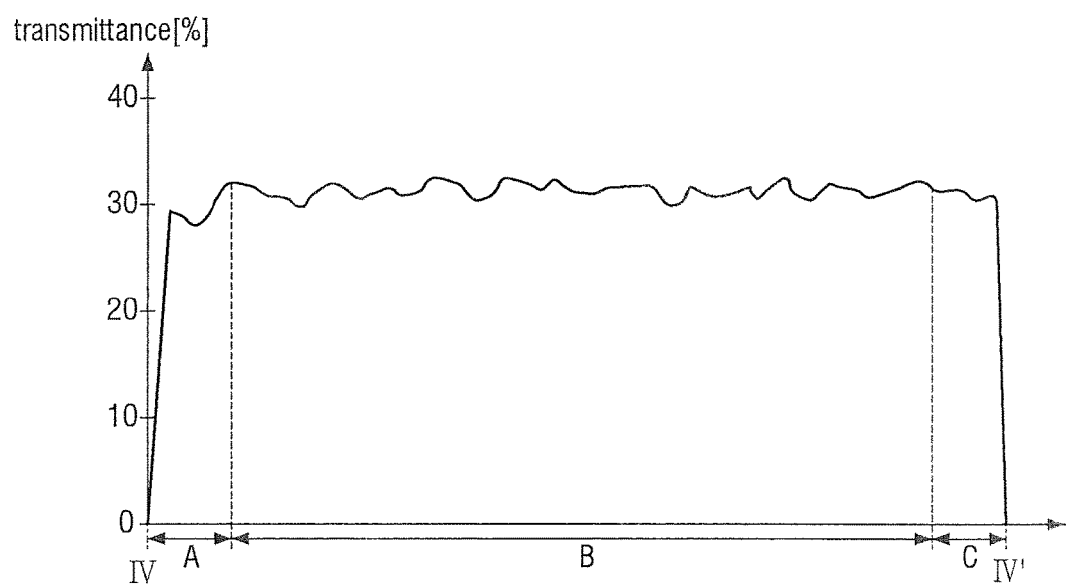
FIG. 6 is a graph showing the transmittance, along line IV-IV' of FIG. 5, of the LCD device according to the exemplary embodiment of FIG. 5.
Figure 7:
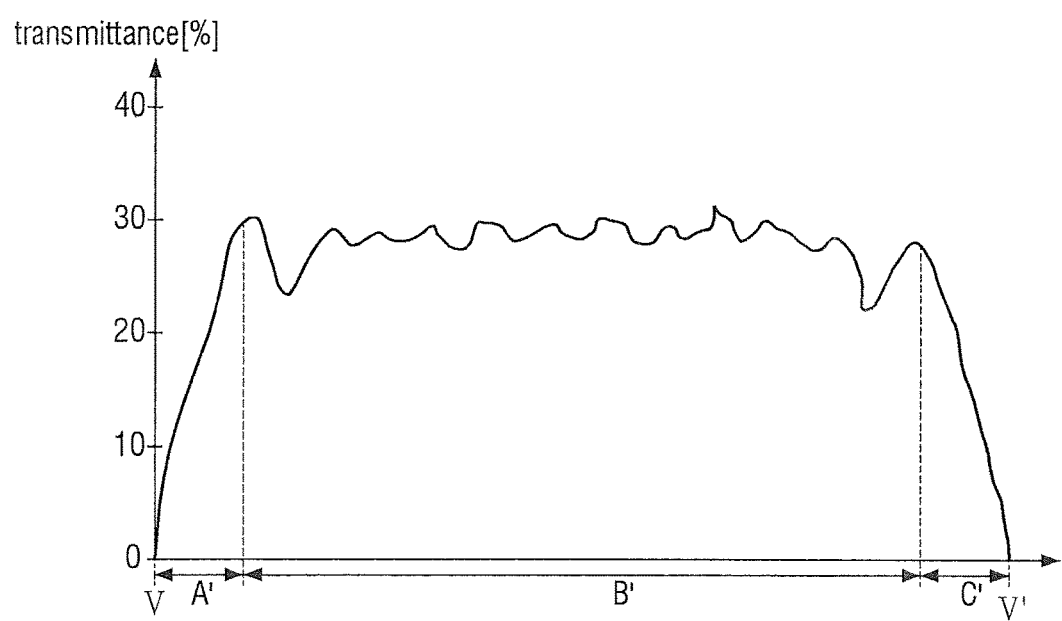
FIG. 7 is a graph showing the transmittance, along line V-V' of FIG. 5, of the LCD device according to the exemplary embodiment of FIG. 5.

FIG. 6 is a graph showing the transmittance, along line IV-IV' of FIG. 5, of the LCD device according to the exemplary embodiment of FIG. 5, and FIG. 7 is a graph showing the transmittance, along line V-V' of FIG. 5, of the LCD device according to the exemplary embodiment of FIG. 5.

Referring to FIG. 5, line IV-IV' extends across one of the first pixel electrodes PE_1a along a first direction d1, and line V-V' extends across one of the second pixel electrodes PE_2a along the first direction d1. Lines IV-IV' and V-V' of FIG. 5 correspond to the same parts of pixels.

Referring to FIGS. 6 and 7, the x-axis represents the location in each of the first pixel electrodes PE_1a or the location in each of the second pixel electrodes PE_2a, and the y-axis represents a transmittance. A higher value on the y-axis represents a higher transmittance, and the measurement unit of a transmittance is %.

As illustrated in FIGS. 6 and 7, the first pixel electrodes PE_1a may have a higher transmittance than the second pixel electrodes PE_2a in some sections. More specifically, the transmittance of the first pixel electrodes PE_1a in section B is generally similar to the transmittance of the second pixel electrodes PE_2a in section B'. The transmittance of the first pixel electrodes PE_1a in section A is much higher than the transmittance of the second pixel electrodes PE_2a in section A'. Also, the transmittance of the first pixel electrodes PE_1a in section C is much higher than the transmittance of the second pixel electrodes PE_2a in section C'.

That is, due to the difference between the structure of the first pixel electrodes PE_1a and the structure of the second pixel electrodes PE_2a, as illustrated in FIG. 5, the transmittance of the first pixel electrodes PE_1a in sections A and C, respectively, may be higher than the transmittance of the second pixel electrodes PE_2a in sections A' and C', respectively.

Figure 8:
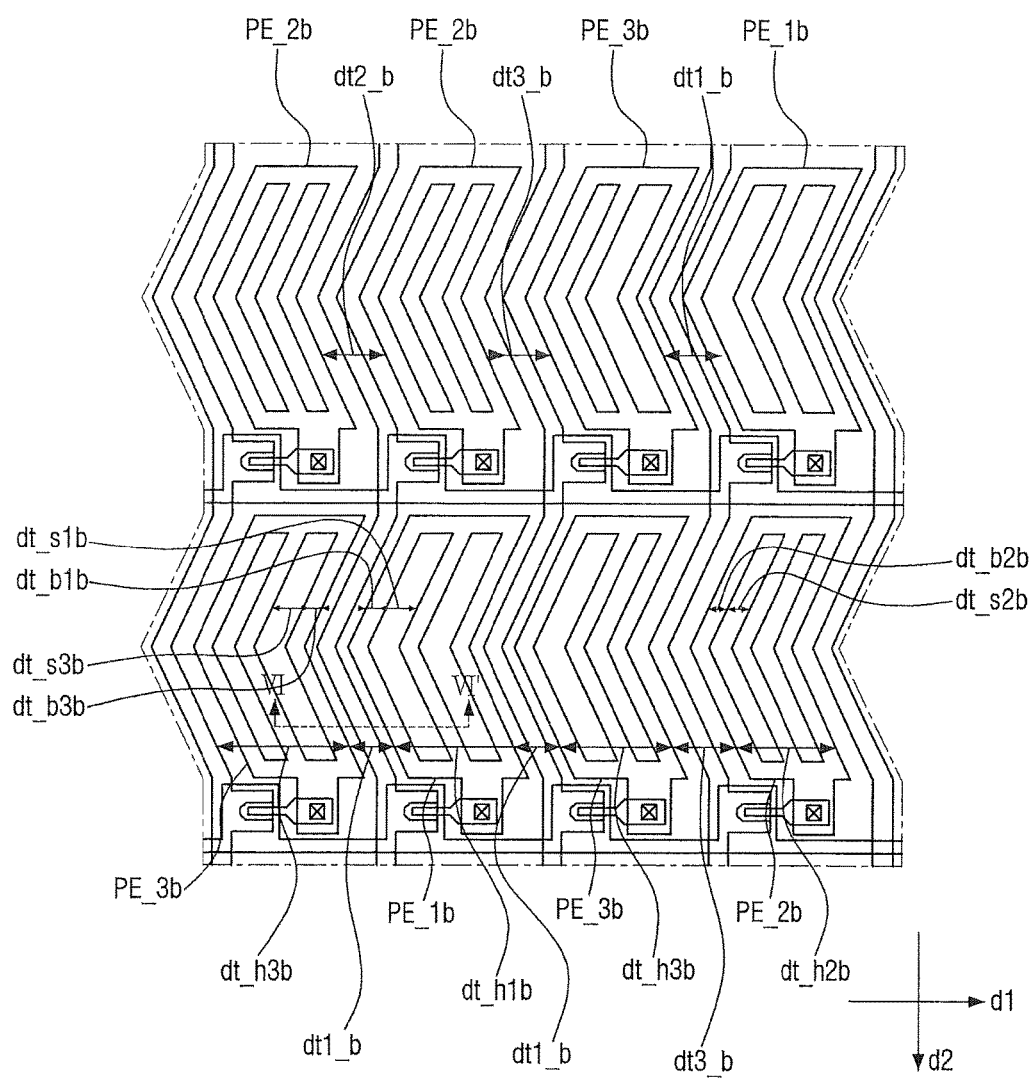
FIG. 8 is a plan view illustrating some pixels of an LCD device according to some other exemplary embodiments of the invention.

FIG. 8 is a plan view illustrating some pixels of an LCD device according to some other exemplary embodiments of the invention, and FIG. 9 is a schematic view illustrating some pixels of the LCD device according to the exemplary embodiment of FIG. 8.

FIG. 9 illustrates which of a red pixel, a green pixel, a blue pixel, and a white pixel each of the pixels of FIG. 8 corresponds to.

In the exemplary embodiments of FIGS. 1, 5, and 8 and 9, like reference numerals indicate like elements, and thus, descriptions thereof will be omitted or at least simplified.

The LCD device according to the exemplary embodiment of FIGS. 8 and 9 differs from the LCD devices according to the exemplary embodiments of FIGS. 1 and 5 in that it further includes third pixels PX3 and third pixel electrodes PE_3b.

FIGS. 8 and 9 illustrate two first pixels PX1, three second pixels PX2, and three third pixels PX3. Referring to FIGS. 8 and 9, the four pixels on the left provide a unit pixel PXU together, and the other four pixels on the right provide a unit pixel PXU together. That is, FIGS. 8 and 9 illustrate two unit pixels PXU.

The first pixels PX1 correspond to white pixels, and each of the second pixels PX2 and the third pixels PX3 may be one of a red pixel, a green pixel, and a blue pixel. FIGS. 8 and 9 illustrate an example in which each unit pixel PXU consists of a red pixel, a green pixel, a blue pixel, and a white pixel, for example. In the left unit pixel PXU, the upper left pixel is a red pixel, the upper right pixel is a green pixel, the lower left pixel is a blue pixel, and the lower right pixel is a white pixel, for example. In the right unit pixel PXU, the upper left pixel is a blue pixel, the upper right pixel is a white pixel, the lower left pixel is a green pixel, and the lower right pixel is a red pixel, for example. That is, the unit pixels PXU may not necessarily have the same pattern of arrangement of a red pixel, a green pixel, a blue pixel, and a white pixel therein, but the invention is not limited thereto. That is, the unit pixels PXU may all have the same pattern of arrangement of a red pixel, a green pixel, a blue pixel, and a white pixel therein.

The first pixels PX1 correspond to white pixels and include first pixel electrodes PE_1b, respectively. The first pixels PX1 and the first pixel electrodes PE_1b may have the same characteristics as the first pixels PX1 and the first pixel electrodes PE_1, respectively, of the exemplary embodiment of FIG. 1.

Each of the second pixels PX2 corresponds to one of a red pixel, a green pixel, and a blue pixel and is not adjacent to any one of the first pixels PX1 in a first direction d1. The second pixels PX2 include second pixel electrodes PE_2b, respectively.

Each of the third pixels PX3 corresponds to one of a red pixel, a green pixel, and a blue pixel. Each of the third pixels PX3 is adjacent to one of the first pixels PX1 on one side thereof in the first direction d1 and is adjacent to one of the second pixels PX2 on the other side thereof in the first direction d1. The third pixels PX3 include the third pixel electrodes PE_3b, respectively.

Every two adjacent first and third pixel electrodes PE_1b and PE_3b may be spaced apart by a first average distance dt1_b in the first direction d1. Every two adjacent second pixel electrodes PE_2b may be spaced apart by a second average distance dt2_b in the first direction d1. Every two adjacent second and third pixel electrodes PE_2b and PE_3b may be spaced apart by a third average distance dt3_b in the first direction d1.

The first average distance dt1_b may be smaller than the second average distance dt2_b, and may also be smaller than the third average distance dt3_b. The second average distance dt2_b may be the same as the third average distance dt3_b.

Consequently, the third pixel electrodes PE_3b are disposed in the third pixels PX3, respectively, to be closer to the respective neighboring first pixels PX1 than to the respective neighboring second pixels PX2. Thus, the first average distance dt1_b may be smaller than the first average distance dt1 of FIG. 1.

Since the first average distance dt1_b is relatively smaller than its counterparts of the previous exemplary embodiments, the control over liquid crystal molecules LC in areas between the first pixel electrodes PE_1b and the second pixel electrodes PE_2b may be further improved. As a result, the transmittance in the areas between the first pixel electrodes PE_1a and the second pixel electrodes PE_2a may be further improved, and at the same time, no color mixing may occur. The prevention of color mixing by the exemplary embodiment of FIGS. 8 and 9 will be described later with reference to FIG. 10.

The first pixel electrodes PE_1b, the second pixel electrodes PE_2b, and the third pixel electrodes PE_3b may have different shapes. More specifically, a first average horizontal length dt_h1b, which is an average of the lengths of the first pixel electrodes PE_1b in the first direction d1, a second average horizontal length dt_h2b, which is an average of the lengths of the second pixel electrodes PE_2b in the first direction d1, and a third average horizontal length dt_h3b, which is an average of the lengths of the third pixel electrodes PE_3b in the first direction d1, may differ from one another. That is, the second average horizontal length dt_h2b may be longer than the third average horizontal length dt_h3b, and the first average horizontal length dt_h2b may be longer than the second average horizontal length dt_h2b. The first, second, and third average horizontal lengths dt_h1b, dt_h2b, and dt_h3b may differ from one another because the first, second, and third average distances dt1_b, dt2_b, and dt3_b may differ from one another.

Since the first, second, and third average horizontal lengths dt_h1b, dt_h2b, and dt_h3b may differ from one another, a first slit length dt_s1b, which is the length, in the first direction d1, of slits SL included in each of the first pixel electrodes PE_1b, a second slit length dt_s2b, which is the length, in the first direction d1, of slits SL included in each of the second pixel electrodes PE_2b, and a third slit length dt_s3b, which is the length, in the first direction d1, of slits SL included in each of the third pixel electrodes PE_3b, may differ from one another. That is, the third slit length dt_s3b may be longer than the second slit length dt_s2b, and the first slit length dt_s1b may be longer than the third slit length dt_s3b. In a case in which the first, second, and third slit lengths dt_s1b, dt_s2b, and dt_s3b differ from one another, a first branch length dt_b1b, which is the length, in the first direction d1, of branch electrodes BR included in each of the first pixel electrodes PE_1b, a second branch length dt_b2b, which is the length, in the first direction d1, of branch electrodes BR included in each of the second pixel electrodes PE_2b, and a third branch length dt_b3b, which is the length, in the first direction d1, of branch electrodes BR included in each of the third pixel electrodes PE_3b, may all be identical.

In an alternative exemplary embodiment, although not specifically illustrated, the first, second, and third slit lengths dt_s1b, dt_s2b, and dt_s3b may all be identical. In this case, the third branch length dt_b3b may be longer than the second branch length dt_b2b and may be shorter than the first branch length dt_b1b. In an alternative exemplary embodiment, the first, second, and third slit lengths dt_s1b, dt_s2b, and dt_s3b may differ from one another, and the first, second, and third branch lengths dt_b1b, dt_b2b, and dt_b3b may also differ from one another.

The reason that color mixing is not caused by the third pixels PX3 and the third pixel electrodes PE_3b will hereinafter be described with reference to FIG. 10.

Figure 10:
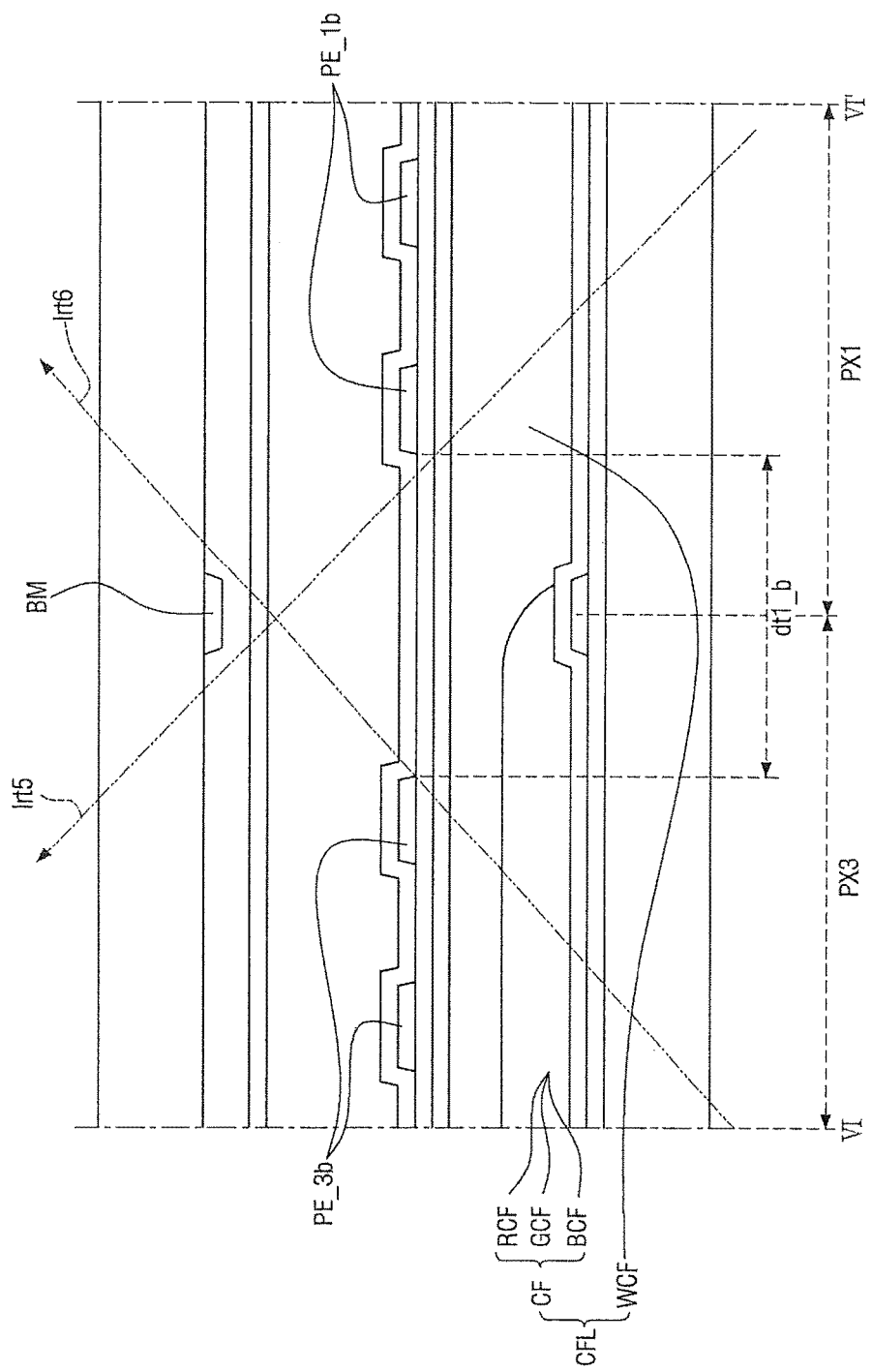
FIG. 10 is a cross-sectional view taken along line VI-VI' of FIG. 8.

FIG. 10 is a cross-sectional view taken along line VI-VI' of FIG. 8.

Referring to FIG. 10, light traveling along a fifth optical path Irt5 does not cause color mixing, as mentioned above with reference to FIG. 3, but an issue may arise as to whether light traveling along a sixth optical path Irt6 causes color mixing.

The light traveling along the sixth optical path Irt6 may be incident from below a third pixel PX3 and may be emitted from the top of a first pixel PX1. In an exemplary embodiment, the first pixel PX1 is a white pixel, and the third pixel PX3 is one of a red pixel, a green pixel, and a blue pixel. Thus, the light traveling along the sixth optical path Irt6 may display an image in two modes, i.e., a first mode in which the first pixel PX1 and the third pixel PX3 both transmit light therethrough to display a white color and a second mode in which the first pixel PX1 does not transmit light therethrough and only the third pixel PX3 transmits light therethrough.

In the mode in which the first pixel PX1 and the third pixel PX3 both transmit light therethrough, i.e., the first mode, will hereinafter be described. In a case in which light incident from the bottom of the first pixel PX1 is emitted toward the top of the third pixel PX3, i.e., in a case in which the incident light travels along the fifth optical path Irt5, the transmittance of the third pixel PX3 may be improved because the first pixel PX1 is a white pixel in which a white color filter WCF is disposed and the light traveling along the fifth optical path Irt5 is white light that does not cause color mixing, but only contributes to the improvement of a transmittance.

In a case in which light incident upon the bottom of the third pixel PX3 travels toward the top of the first pixel PX1, i.e., in a case in which the incident light travels along the sixth optical path Irt6, a non-white color may be displayed in the first pixel PX1, which is a white pixel, because of the incident light. To display a white color, other pixels in the same unit pixel PXU as the first and third pixels PX1 and PX3, i.e., two second pixels PX2 (not illustrated), may also operate. The third pixel PX3 and the two second pixels PX2 may correspond to a red pixel, a green pixel, and a blue pixel. Light transmitted through the third pixel PX3, light transmitted through each of the two second pixels PX2, and the light traveling along the sixth optical path Irt6 may gather together to display a white color, and thus, the degradation of display quality by color mixing does not occur. Also, the transmittance of the LCD device according to the exemplary embodiment of FIGS. 8 and 9 is improved due to the light traveling along the sixth optical path Irt6.

The mode in which the first pixel PX1 does not transmit light therethrough but only the third pixel PX3 transmits light therethrough, i.e., the second mode, will hereinafter be described. A case in which only the third pixel PX3 transmits light therethrough corresponds to a case in which a non-white image is displayed. In the second mode, a color intended to be displayed in the third pixel PX3 may be displayed in the first pixel PX1 because of the light traveling along the optical path Irt6. However, since the first pixel PX1 is a pixel that displays none of a red color, a green color, and a blue color, the first pixel PX1 displays some of the color of the third pixel PX3, but does not appear in any other color than the color of the third pixel PX3. As a result, the light traveling along the optical path Irt6 simply contributes to the improvement of the transmittance of the LCD device according to the exemplary embodiment of FIGS. 8 and 9 and does not cause the degradation of display quality that may occur due to color mixing.

While the invention has been particularly illustrated and described with reference to exemplary embodiments thereof, it will be understood by those of ordinary skill in the art that various changes in form and detail may be made therein without departing from the spirit and scope of the invention as defined by the following claims. The exemplary embodiments should be considered in a descriptive sense only and not for purposes of limitation.

What is claimed is:

1. A liquid crystal display device, comprising:
    first and second substrates facing each other and including a plurality of pixels, which are arranged in a form of a matrix to be adjacent to one another in a first direction and in a second direction which crosses the first direction;
    a liquid crystal layer interposed between the first and second substrates;
    a common electrode disposed on the first substrate; and
    pixel electrodes disposed in the plurality of pixels, respectively, over the common electrode, each of the pixel electrodes including branch electrodes, which extend in the second direction,
    wherein:
    the plurality of pixels includes first pixels, which display a white color, and second pixels, which display one of a red color, a green color, and a blue color;
    the pixel electrodes include first pixel electrodes, which are disposed in the first pixels, respectively, and second pixel electrodes, which are disposed in the second pixels, respectively; and
    a first average distance between every two adjacent first and second pixel electrodes in the first direction is smaller than a second average distance between every two adjacent second pixel electrodes in the first direction,
    wherein two adjacent pixels of the plurality of pixels in the first direction and two adjacent pixels of the plurality of pixels in the second direction provide a unit pixel, the unit pixel is repeatedly arranged in the first direction and the second direction and the unit pixel includes one first pixel and three second pixels,
    wherein the first pixel displays a white color, the three second pixels respectively display a red color, a green pixel, and a blue color.

2. The liquid crystal display device of claim 1, wherein a first average horizontal length, which is an average of lengths of the first pixel electrodes in the first direction, is longer than a second average horizontal length, which is an average of lengths of the second pixel electrodes in the first direction.

3. The liquid crystal display device of claim 1, further comprising:
    gate lines extending in the first direction and data lines extending in the second direction,
    wherein an average of distances between the first pixel electrodes and the respective neighboring data lines is smaller than an average of distances between the second pixel electrodes and the respective neighboring data lines.

4. The liquid crystal display device of claim 1, wherein a number of branch electrodes included in each of the first pixel electrodes is larger than a number of branch electrodes included in each of the second pixel electrodes.

5. The liquid crystal display device of claim 4, wherein an average of distances between the branch electrodes included in each of the first pixel electrodes is equal to or smaller than, an average of distances between the branch electrodes included in each of the second pixel electrodes.

6. The liquid crystal display device of claim 1, wherein an arrangement of the first pixel displaying the white color, the second pixel displaying the red color, the second pixel displaying the green pixel, and the second pixel displaying the blue color is uniform for all unit pixels of the plurality of pixels.

7. The liquid crystal display device of claim 1, wherein when the first pixel electrodes are disposed adjacent to one another in the first direction, an average of distances among the first pixel electrodes is equal to or smaller than the first average distance.

8. A liquid crystal display device, comprising:
    first and second substrates facing each other and including a plurality of pixels, which are arranged in a form of a matrix to be adjacent to one another in a first direction and in a second direction which crosses the first direction;
    a liquid crystal layer interposed between the first and second substrates;
    a common electrode disposed on the first substrate; and
    pixel electrodes disposed in the plurality of pixels, respectively, over the common electrode, each of the pixel electrodes including branch electrodes, which extend in the second direction,
    wherein:
    the plurality of pixels includes first pixels, which display a white color, and second pixels, which display one of a red color, a green color, and a blue color;
    the pixel electrodes include first pixel electrodes, which are disposed in the first pixels, respectively, and second pixel electrodes, which are disposed in the second pixels, respectively; and
    a first average distance between every two adjacent first and second pixel electrodes in the first direction is smaller than a second average distance between every two adjacent second pixel electrodes in the first direction,
    wherein the first average distance is in a range of 4.5 micrometers to 4.7 micrometers.

9. A liquid crystal display device, comprising:
    first and second substrates facing each other and including a plurality of pixels, which are arranged in a form of a matrix to be adjacent to one another in a first direction and in a second direction which crosses the first direction;
    a liquid crystal layer interposed between the first and second substrates;
    a common electrode disposed on the first substrate; and
    pixel electrodes disposed in the plurality of pixels, respectively, over the common electrode, each of the pixel electrodes including branch electrodes, which extend in the second direction,
    wherein:
    the plurality of pixels includes first pixels, which display a white color, and second pixels, which display one of a red color, a green color, and a blue color;
    the pixel electrodes include first pixel electrodes, which are disposed in the first pixels, respectively, and second pixel electrodes, which are disposed in the second pixels, respectively; and
    a first average distance between every two adjacent first and second pixel electrodes in the first direction is smaller than a second average distance between every two adjacent second pixel electrodes in the first direction,
    wherein an average of distances between the branch electrodes included in each of the first pixel electrodes is larger than an average of distances between the branch electrodes included in each of the second pixel electrodes.

10. A liquid crystal display device, comprising:
    first and second substrates facing each other and including a plurality of pixels, which are arranged in a form of a matrix to be adjacent to one another in a first direction and in a second direction which crosses the first direction;
a liquid crystal layer interposed between the first and second substrates;
a common electrode disposed on the first substrate; and
pixel electrodes disposed in the plurality of pixels, respectively, over the common electrode, each of the pixel electrodes including branch electrodes, which extend in the second direction,
wherein:
the plurality of pixels includes first pixels, which display a white color, second pixels, which display one of a red color, a green color, and a blue color and are not adjacent to any one of the first pixels in the first direction, and third pixels, which display one of a red color, a green color, and a blue color and are adjacent to the first pixels in the first direction;
the pixel electrodes include first pixel electrodes, which are disposed in the first pixels, respectively, second pixel electrodes, which are disposed in the second pixels, respectively, and third pixel electrodes, which are disposed in the third pixels, respectively;
every two adjacent first and third pixel electrodes in the first direction are spaced apart by a first average distance;
every two adjacent third pixel electrodes in the first direction are spaced apart by a second average distance;
every two second and third pixel electrodes in the first direction are spaced apart by a third average distance;
the first average distance is smaller than the second and third average distances; and
the second and third average distances are identical,
wherein two adjacent pixels of the plurality of pixels in the first direction and two adjacent pixels of the plurality of pixels in the second direction provide a unit pixel, the unit pixel is repeatedly arranged in the first direction and the second direction and the unit pixel includes one first pixel and three second or third pixels,
wherein the unit pixel includes a first pixel displaying a white color, a second or third pixel displaying a red color, a second or third pixel displaying a green pixel, and a second or third pixel displaying a blue color.

11. The liquid crystal display device of claim 10, wherein the third pixel electrodes are disposed closer to the respective neighboring first pixel electrodes on a first side thereof in the first direction than to the respective neighboring second pixel electrodes on a second side thereof in the first direction.

12. The liquid crystal display device of claim 10, wherein when the first pixel electrodes are disposed adjacent to one another in the first direction, an average of distances among the first pixel electrodes is equal to or smaller than the first average distance.

13. A liquid crystal display device, comprising:
first and second substrates facing each other and including a plurality of pixels, which are arranged in a form of a matrix to be adjacent to one another in a first direction and in a second direction which crosses the first direction;
a liquid crystal layer interposed between the first and second substrates;
a common electrode disposed on the first substrate; and
pixel electrodes disposed in the plurality of pixels, respectively, over the common electrode, each of the pixel electrodes including branch electrodes, which extend in the second direction,
wherein:
the plurality of pixels includes first pixels, which display a white color, second pixels, which display one of a red color, a green color, and a blue color and are not adjacent to any one of the first pixels in the first direction, and third pixels, which display one of a red color, a green color, and a blue color and are adjacent to the first pixels in the first direction;
the pixel electrodes include first pixel electrodes, which are disposed in the first pixels, respectively, second pixel electrodes, which are disposed in the second pixels, respectively, and third pixel electrodes, which are disposed in the third pixels, respectively;
every two adjacent first and third pixel electrodes in the first direction are spaced apart by a first average distance;
every two adjacent third pixel electrodes in the first direction are spaced apart by a second average distance;
every two second and third pixel electrodes in the first direction are spaced apart by a third average distance;
the first average distance is smaller than the second and third average distances; and
the second and third average distances are identical,
wherein the first average distance is in a range of 4.5 micrometers to 4.7 micrometers.

14. A liquid crystal display device, comprising:
first and second substrates facing each other and including a plurality of pixels, which are arranged in a form of a matrix to be adjacent to one another in a first direction and in a second direction which crosses the first direction;
a liquid crystal layer interposed between the first and second substrates;
a common electrode disposed on the first substrate; and
pixel electrodes disposed in the plurality of pixels, respectively, over the common electrode, each of the pixel electrodes including branch electrodes, which extend in the second direction,
wherein:
the plurality of pixels includes first pixels, which display a white color, second pixels, which display one of a red color, a green color, and a blue color and are not adjacent to any one of the first pixels in the first direction, and third pixels, which display one of a red color, a green color, and a blue color and are adjacent to the first pixels in the first direction;
the pixel electrodes include first pixel electrodes, which are disposed in the first pixels, respectively, second pixel electrodes, which are disposed in the second pixels, respectively, and third pixel electrodes, which are disposed in the third pixels, respectively;
every two adjacent first and third pixel electrodes in the first direction are spaced apart by a first average distance;
every two adjacent third pixel electrodes in the first direction are spaced apart by a second average distance;
every two second and third pixel electrodes in the first direction are spaced apart by a third average distance;
the first average distance is smaller than the second and third average distances; and
the second and third average distances are identical,
wherein:
an average of lengths of the first pixel electrodes in the first direction is a first average horizontal length;
an average of lengths of the second pixel electrodes in the first direction is a second average horizontal length;

an average of lengths of the third pixel electrodes in the first direction is a third average horizontal length;

the second average horizontal length is longer than the third average horizontal length; and the first average horizontal length is longer than the second average horizontal length.

15. A liquid crystal display device, comprising:

first and second substrates facing each other and including a plurality of pixels, which are arranged in a form of a matrix to be adjacent to one another in a first direction and in a second direction which crosses the first direction;

a liquid crystal layer interposed between the first and second substrates;

a common electrode disposed on the first substrate; and pixel electrodes disposed in the plurality of pixels, respectively, over the common electrode, each of the pixel electrodes including branch electrodes, which extend in the second direction, wherein:

the plurality of pixels includes first pixels, which display a white color, second pixels, which display one of a red color, a green color, and a blue color and are not adjacent to any one of the first pixels in the first direction, and third pixels, which display one of a red color, a green color, and a blue color and are adjacent to the first pixels in the first direction;

the pixel electrodes include first pixel electrodes, which are disposed in the first pixels, respectively, second pixel electrodes, which are disposed in the second pixels, respectively, and third pixel electrodes, which are disposed in the third pixels, respectively;

every two adjacent first and third pixel electrodes in the first direction are spaced apart by a first average distance;

every two adjacent third pixel electrodes in the first direction are spaced apart by a second average distance;

every two second and third pixel electrodes in the first direction are spaced apart by a third average distance;

the first average distance is smaller than the second and third average distances; and the second and third average distances are identical, further comprising:

gate lines extending in the first direction and data lines extending in the second direction, wherein an average of distances between the first pixel electrodes and the respective neighboring data lines is smaller than an average of distances between the second pixel electrodes and the respective neighboring data lines, wherein:

an average of distances between the third pixel electrodes and the respective neighboring data lines in a direction in which the third pixel electrodes are adjacent to the respective first pixel electrodes is the same as the average of the distances between the first pixel electrodes and the respective neighboring data lines; and an average of the distances between the third pixel electrodes and the respective neighboring data lines in a direction in which the third pixel electrodes are adjacent to the respective second pixel electrodes is the same as the average of the distances between the second pixel electrodes and the respective neighboring data lines.

16. A liquid crystal display device, comprising:

first and second substrates facing each other and including a plurality of pixels, which are arranged in a form of a matrix to be adjacent to one another in a first direction and in a second direction which crosses the first direction;

a liquid crystal layer interposed between the first and second substrates;

a common electrode disposed on the first substrate; and pixel electrodes disposed in the plurality of pixels, respectively, over the common electrode, each of the pixel electrodes including branch electrodes, which extend in the second direction, wherein:

the plurality of pixels includes first pixels, which display a white color, second pixels, which display one of a red color, a green color, and a blue color and are not adjacent to any one of the first pixels in the first direction, and third pixels, which display one of a red color, a green color, and a blue color and are adjacent to the first pixels in the first direction;

the pixel electrodes include first pixel electrodes, which are disposed in the first pixels, respectively, second pixel electrodes, which are disposed in the second pixels, respectively, and third pixel electrodes, which are disposed in the third pixels, respectively;

every two adjacent first and third pixel electrodes in the first direction are spaced apart by a first average distance;

every two adjacent third pixel electrodes in the first direction are spaced apart by a second average distance;

every two second and third pixel electrodes in the first direction are spaced apart by a third average distance;

the first average distance is smaller than the second and third average distances; and the second and third average distances are identical, wherein:

an average of distances between the branch electrodes included in each of the second pixel electrodes is larger than an average of distances between the branch electrodes included in each of the third pixel electrodes; and an average of distances between the branch electrodes included in each of the first pixel electrodes is larger than an average of distances between the branch electrodes included in each of the second pixel electrodes.

17. A liquid crystal display device, comprising:

first and second substrates facing each other and including a plurality of pixels, which are arranged in a form of a matrix to be adjacent to one another in a first direction and in a second direction which crosses the first direction;

a liquid crystal layer interposed between the first and second substrates;

a common electrode disposed on the first substrate; and pixel electrodes disposed in the plurality of pixels, respectively, over the common electrode, each of the pixel electrodes including branch electrodes, which extend in the second direction, wherein:

the plurality of pixels includes first pixels, which display a white color, second pixels, which display one of a red color, a green color, and a blue color and are not adjacent to any one of the first pixels in the first direction, and third pixels, which display one of a red color, a green color, and a blue color and are adjacent to the first pixels in the first direction;

the pixel electrodes include first pixel electrodes, which are disposed in the first pixels, respectively, second pixel electrodes, which are disposed in the second pixels, respectively, and third pixel electrodes, which are disposed in the third pixels, respectively;

every two adjacent first and third pixel electrodes in the first direction are spaced apart by a first average distance;

every two adjacent third pixel electrodes in the first direction are spaced apart by a second average distance;

every two second and third pixel electrodes in the first direction are spaced apart by a third average distance;

the first average distance is smaller than the second and third average distances; and the second and third average distances are identical, wherein:

a number of branch electrodes included in each of the second pixel electrodes is larger than a number of branch electrodes included in each of the third pixel electrodes; and a number of branch electrodes included in each of the first pixel electrodes is larger than the number of branch electrodes included in each of the second pixel electrodes.

* * * * *